March 22, 1966     W. C. PFEFFERLE     3,241,293
DIFFUSION PURIFICATION OF GASES
Filed Aug. 24, 1962

INVENTOR.
WILLIAM C. PFEFFERLE
BY Samuel Kahn
ATTORNEY

United States Patent Office 3,241,293
Patented Mar. 22, 1966

3,241,293
DIFFUSION PURIFICATION OF GASES
William C. Pfefferle, 51 Woodland Drive,
Middletown, N.J.
Filed Aug. 24, 1962, Ser. No. 219,161
7 Claims. (Cl. 55—16)

This invention relates to diffusion purification and, particularly, to gas recovery methods and apparatus utilizing the selective diffusion properties of specific gases and materials employed as diffusion membranes. The invention is especially concerned with an improved process for the separation of a gas from a mixture of gases by means of the selective diffusion of such gas through thin unsupported diffusion foils. More specifically, the invention relates to process and apparatus for effecting diffusion separation of gases through thin unsupported diffusion foils using balanced or nearly balanced pressures on the upstream and downstream sides of such foils.

The selective diffusion of certain gases through various solid materials is a well known phenomenon. Thus, commercially-available hydrogen has been purified by selective diffusion through palladium or palladium alloy membranes, employing, for example, apparatus of the type disclosed in U.S. Patent 2,911,057, of R. B. Green. Highly selective diffusion of gases other than hydrogen is known, for example, the diffusion of oxygen through silver barriers.

Efficient commercial applications of this phenomenon for the purification of gases or the separation of gaseous mixtures are highly desirable and are still being sought. The principal problem to be overcome in developing commercially useful diffusion purification systems derives from the fact that, in order to obtain a reasonable rate of diffusion for commercial use, it is necessary to operate with very thin diffusion elements and/or to maintain a large pressure differential across the diffusion membrane. It is obvious that the thinner the membrane, the less the pressure differential that can be tolerated between the upstream and downstream sides of the membrane without collapse or rupture thereof. It has been found that the rate of increase in the resistance to flow of hydrogen through hydrogen-permeable membranes as the thickness of the membrane increaes is greater than the rate of increase in flow through the membrane with increases of pressure to the rupture point. As a result, an increase in the thickness of the membrane to permit use of higher pressure differentials is not ordinarily effective in increasing the rate of flow of gas by diffusion through the membrane.

In order to achieve commercially useful flow rates in diffusion apparatus, the art has hitherto employed membranes in the form of thin tubes or in the form of thin foils of gas-permeable metal which are disposed upon rigid supporting structures. Tubing has the advantage of being capable of withstanding greater pressure than foil of the same thickness. However, the utilization of tubing introduces certain disadvantages in the fabrication of diffusion apparatus. Tubing is harder to fabricate than foil. Additionally, it is difficult to repair equipment in which tubing is used.

In order to effectively employ thin metal foils for diffusion purposes, the art has turned to use of various supports for such foils to lend structural strength sufficient to resist deforming effects of pressure differentials across the foil barrier. Fibrous supports, ceramic structures, and sintered metals have been employed for this purpose, such materials being porous in structure so as to permit removal of diffused gas from the downstream side of the diffusion barrier. Such supporting materials, however, introduce certain disadvantages in operating diffusion apparatus. Typically, such apparatus is employed at elevated temperature, e.g. above 450° C., and at such temperature, diffusion membranes composed of palladium or its alloys dilate on exposure to hydrogen, and contract on removing the hydrogen. Because of the intermittent expansion and contraction of the foil encountered in normal operation of diffusion apparatus, it is necessary to choose a support having a thermal coefficient of expansion and a dilation coefficient sufficiently similar to the foil material to prevent wrinkling and tearing of the film in use. Additionally, the inclusion of a structural support of sufficient rigidity to resist pressure deformation introduces the hazard of additional rough edges and burrs being present, which increases the possibility of developing leaks in the system.

One object of this invention is to provide a method for separating a gas from a mixture of gases by means of diffusion through thin unsupported diffusion foils. Another object is to provide a method and apparatus for separating or purifying gases by diffusion through unsupported thin foils wherein the pressure differential between the upstream and downstream sides of the diffusion foil is maintained below that harmful to the foil. A more specific object is to provide means for separating and for purifying hydrogen of high purity at desirable temperatures and pressures employing simple equipment readily adaptable to commercial operation. A further object of this invention is to provide method and means employing thin foils for gas purification by diffusion to enable the rate of input and output gases to be maximized while minimizing the pressure drop in the diffusion unit.

These and other objects of this invention are realized by the utilization of a diffusion purification system comprising a diffusion purifier having input and recovery chambers separated by thin foil membranes selectively permeable to a selected gas, each chamber being provided with an input and an outlet, and by supplying a stripper gas to the recovery chamber, the rate of flow of the gas to the input chamber or to the recovery chamber, or both, being responsive to any pressure differential between the chambers and controlled to equalize the pressure on the upstream and downstream sides of the foil membrane.

In the following more detailed description of the invention, particular reference is made to the purification or separation of hydrogen from hydrogen-containing gaseous mixtures by diffusion through palladium or palladium alloy membranes, but it is to be understood that the invention in its broadest aspects is applicable to diffusion separation of any gas through thin membranes of materials selectively permeable to such gas. Thus, while palladium and certain of its alloys, for example palladium-silver alloys containing from about 20 to 40% silver, palladium-ruthenium alloys containing up to 10% by weight ruthenium, palladium-gold alloys containing from about 20–40% gold, palladium-boron alloys and the like are effective for diffusion of hydrogen, the invention is applicable to diffusion purification of hydrogen through other known hydrogen-permeable materials, including metals of Group VIII and their alloys, e.g. iron, nickel, copper, platinum and molybdenum. Oxygen may be purified similarly by diffusion through thin silver foil barriers.

In the separation of hydrogen from a gaseous mixture by diffusion through the lattice structure of a non-porous hydrogen permeable membrane, it is known to pass the hydrogen-containing gas along one side of the membrane and to pass a sweep medium along the opposite side of the membrane. Hydrogen which passes through the barrier is thus continuously removed, the sweep medium acting to sweep the hydrogen away from the boundary. It is further known that such sweep gas can be applied in co-current or in counter-current flow with respect to the hydrogen-containing input gas, the advantages of countercurrent flow being more fully disclosed in copending application Serial No. 19,393, filed April 1, 1960, of W. C. Pfefferle. Utilization of a sweep gas serves not only to remove diffused hydrogen from close proximity to the permeable membrane, but continuously acts to maintain a low partial pressure of $H_2$ in the recovery chamber and to thus provide a hydrogen partial pressure differential across the barrier which permits rapid diffusion of $H_2$ therethrough.

In accordance with the present invention, the pressure differential across the foil barrier in diffusion apparatus is equalized or substantially equalized by controlling the rate of flow of gas to the input and/or recovery chamber in order to maintain the total pressure differential across the barrier below the rupture pressure of the particular foil being employed. The limiting pressure differential which can be tolerated in any particular case will depend upon a number of factors, including the specific composition of the foil, its thickness, and the area of the unsupported section of the foil. When foils of less than 1 mil thickness are used, control of pressure differentials to below 10 p.s.i. is desirable, and when the unsupported area of such foils is large, for example, circular foils of a foot or more diameter, control of the pressure differential below 1 p.s.i. is required. On the other hand, thicker foils, e.g. up to 5 mils in thickness, may tolerate pressure differentials of 50 or even 100 p.s.i. without rupture.

While the pressure differential across the diffusion barrier is controlled so as to substantially equalize the pressure in the input and recovery chambers of the diffusion apparatus, it will be understood that such apparatus can be operated at any total pressure desired, depending upon the design of the shell of the apparatus, and independent of the thickness of the foil barrier being employed. For example, such apparatus can be employed at pressures of from about 2 to about 100 atmospheres, or even more, provided only that substantially the same pressure be used on both sides of the barrier foil.

An additional advantage of using the process of this invention is that small pinholes or perforations can be tolerated because the driving force for gases to pass through such a hole is proportional to the pressure drop across the hole. This pressure drop is minimized in operation, resulting in little tendency for mass transport through such holes. It is even possible to operate the recovery chamber of the diffusion apparatus at slightly higher pressure than the input chamber, so that any leaks through inadvertent pin holes which develop in the barrier are from the product side to the crude side of the barrier.

Equalized pressure on each side of the diffusion membrane can be controlled by various methods, for example electrically by a pressure-equalizing transducer of the type well known to the art. In such a device, movement to a Bourdon tube, diaphragm or bellows changes an electric signal which is amplified and can be employed to control inlet flow velocities to each side of the membrane. It is to be understood that such flow control can be provided to either the inlet gas stream or the stripper gas stream, the uncontrolled stream being fed to the diffusion system at substantially constant conditions of pressure and flow velocity, or suitable controls can be provided to adjust both streams. Since the diffusion apparatus is provided with a gas outlet on each side of the membrane, quick response inlet flow control serves directly to equalize total pressures in the system. Ordinarily, on the upstream side a small per cent of bleed-off with fixed inlet gas flow maintains a constant pressure and on the downstream side the controlled stripper gas and diffused gas mixture flow steadily away from the recovery chamber.

By "stripper gas" is meant a gas which aids in the separation or extraction of the diffusable gas. A stripper gas used in accordance with this invention is characterized by the absence or small concentration of the diffusible gas. In this way, although the total pressure at which the stripper gas is provided balances the pressure of the input crude gas, the partial pressure of the diffusible gas on the downstream side is minimized. Also, the stripper gas serves to minimize the partial pressure of the diffusible gas on the downstream side by carrying the diffusible gas out of the system.

The stripper gases which are advantageously used vary with the particular process under consideration. If a pure diffused product is being sought, the stripper gas should be easily-separable from the diffusible gas, e.g., an easily-condensable stripper gas is used where the diffusible gas is very volatile, such as steam as a stripper gas with hydrogen as the diffusible gas. If the diffusible gas is to be mixed eventually with another gas as a step in a given process, it would be particularly valuable to use a stripper gas which, when mixed with the diffusible gas, would be a mixture which could be utilized as such to provide a desired result. For example, in a process for the synthesis of ammonia, a suitable mixture of hydrogen and nitrogen can be obtained using nitrogen as the stripper gas in a hydrogen diffusion unit. The stripper gas can contain substantial amounts of diffusible gas, provided only that the partial pressure of the diffusible gas is less on the downstream side of the diffusion carrier than on the upstream side.

The stripper gas can be provided in a direction which is essentially counter-current or co-current to the direction of flow of the upstream gas. However, a counter-current flow has been found to be more efficient.

The selection of a diffusion foil is not material to this invention. Such selection will depend on the particular system under consideration. For example, palladium and palladium alloys (e.g., Pd-Ag or Pd-Ru) have been found to be effective for the diffusion of $H_2$. As another instance, silver foils may be used for the diffusion of oxygen. Other selective diffusion systems are well known and are disclosed, e.g., in an article entitled "Permeation of Gases Through Solids," Journal of Applied Physics, vol. 28, No. 1, pages 34–39 (January 1957).

The unsupported foils of this invention are not limited by the strength properties of the materials. It is advantageous to have the foils as thin as possible since the rate of diffusion of a gas through a metal varies inversely with the thickness down to thicknesses below those of interest for diffusion separation. The lower limit of thickness of such foils is limited by practical considerations, such as damage by handling, fabrication methods and costs. A suitable range of thickness for Pd or Pd alloy foils, for example, is from 0.1 mil to about 5 mils, with a preferred range of about 0.3 to about 1 mil. Larger surface areas will result in greater rates of diffusion; however, again practical considerations such as size requirements of the units would be important factors. For example, the larger the diameter of the foil, the larger the diameter flange needed to withstand the pressure. As a practical matter therefore, the foil might be limited to a diameter of under 2 feet, with 3 inches to 1 foot preferred.

In a typical diffusion unit, one or more foils can be used to form, in the latter case, multiple input chambers and recovery chambers within the diffusion apparatus. The input chambers as well as the recovery chambers can be separately connected in series relationship, but it has been found desirable, because of pressure drops, to manifold the lines so that the inlet gas and stripper gas is fed to the chambers in parallel rather than into one chamber and then into another in series.

In suitable diffusion units which are employed in the practice of the invention, the foils are provided with O ring gaskets of soft metal such as silver to provide a leak-proof seal capable of withstanding the heat and pressure employed. The foils are placed in the unit preferably with slack to avoid tearing or cracking of the barrier.

One method of achieving such slack is through the use of crinkled or embossed foil, concentric sine curve indentations in a round foil being found suitable. Such indentations can be made without damage to the foil by pressing with a suitable rubber form into a die.

Other objects, features and certain advantages of the invention will be readily comprehended from a consideration of the following detailed description and the drawings in which.

Figure 1:
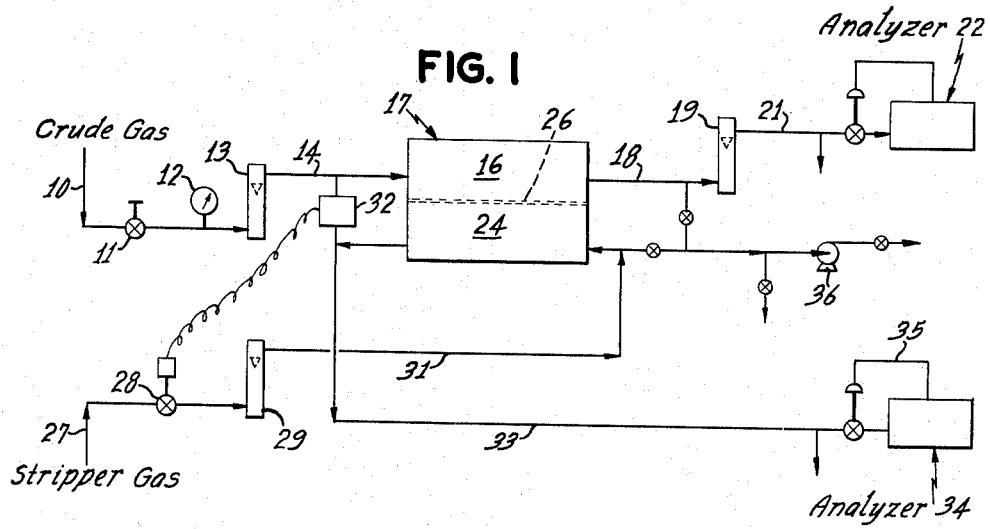
FIGURE 1 is a simplified block diagram of a diffusion system in accordance with the present invention.

With reference to the drawings, FIGURE 1 is a schematic showing of a one-stage purification unit in accordance with the present invention. In FIGURE 1, raw gas containing hydrogen is applied to inlet tube 10 and enters the system through regulator 11 at a pressure set on pressure gauge 12 and at a flow indicated on rotameter 13.

The gas diffuser is preferably heated to an elevated temperature to carry out the diffusion. In the case $H_2$ diffuison through Pd and its alloys, temperatures of 200° to 800° C., and preferably 400° to 600° C. are used. Heat input to provide such temperatures at the diffusion membrane may be provided by direct heating of the diffusion chambers, or entirely or in part by preheating to a suitable temperature the feed and/or stripper gas streams.

The input gas is fed by line 14 to input chamber 16 of diffusion purification unit 17. The bleed from the upstream side of the diffusion unit is exhausted by line 18 through rotameter 19. Valved bleed line 21 may optionally be provided with a gas analyzer 22 to monitor the composition of the off-gases.

The diffusion purification unit includes a recovery chamber 24 separated from input chamber 16 by thin foil 26, which in the purification or recovery of $H_2$ from hydrogen-containing gas streams suitably consists of palladium or palladium alloy, e.g., palladium-25% silver alloy. In actual practice, the diffusion unit may comprise a large group of input chambers and recovery chambers, each pair of input and recovery chambers being suitably separated by a foil barrier. The diffusion unit may be maintained at a temperature of several hundred degrees centigrade by means of a heating coil, or the like.

In the stripper gas system, the stripper gas, for example, nitrogen, is fed by line 27 from source not shown through a valve 28 and a rotameter 29 to line 31 and into recovery chamber 24. In FIGURE 1, flow of the stripper gas is shown to be countercurrent to the flow of input gas, but cocurrent flow may be used. The pressure of the nitrogen stripper stream is regulated by a differential pressure transducer 32 across the upstream 16 and downstream 24 sides of diffusion unit 17, as shown. The signal generated by transducer 32 (including suitable amplification and control apparatus, not shown) is applied to valve 28 to regulate the rate of flow of nitrogen stripper gas to maintain equalized pressure on each side of membrane 26. While rapid response transducer means are preferred to exercise the necessary pressure control to maintain a balanced pressure across the permeable barrier, e.g., a pressure differential preferably below 10 p.s.i. and most preferably below 1 p.s.i., control can be exercised by manual pressure controls, although the danger of foil breakage by too slow adjustment or overcompensation is thereby increased.

Product gas, consisting, e.g., of hydrogen and nitrogen, is exhausted through valved line 33, which may be provided with a sample line 35 and gas analyzer 34 to monitor the composition of the product gas. Pump 36 is provided for evacuating either or both sides of the diffusion unit, through suitable valved lines, particularly for determining the presence or absence of leaks in the system.

Figure 2:
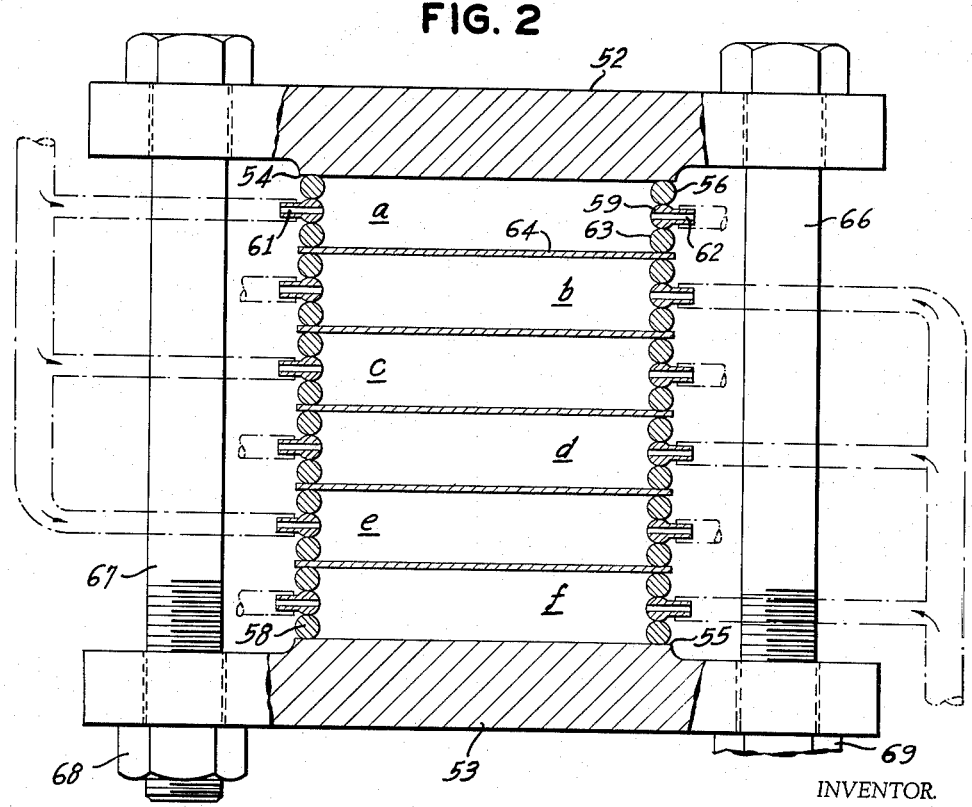
FIGURE 2 is a representation of a diffusion unit suitable for the practice of the present invention.

FIGURE 2 shows the arrangement of a test cell used in conjunction with the system described in FIGURE 1. In FIGURE 2, two stainless steel flanges 52 and 53 are provided with raised seats 54 and 55 which are smoothly finished to provide a leak-proof seat for O ring gaskets 56 and 58 which are suitably made of silver or other soft metal. Gasket 56 abuts suitable stainless steel O ring 59 provided with inlet 61 and outlet 62, separated by a second soft metal gasket 63 from foil membrane 64. A series of alternating gaskets, stainless steel O rings of the type of member 59 and soft metal gaskets is stacked to provide alternating input and product recovery chambers. The entire apparatus is provided with bolts 66 and 67 and associated nuts 68 and 69 which can be tightened to form a leak-proof diffusion system. In operation, chambers $a$, $c$, and $e$ are suitably connected for series flow of input gas or for parallel flow through the chambers by suitable manifolding, and chambers $b$, $d$ and $f$ similarly interconnected for flow of stripper gas.

EXAMPLE I

The apparatus used was of the type shown in FIGURE 1, but using manual pressure controls. The diffusion unit consisted of 5 foils (6 chambers) as shown in FIGURE 2. The foils were of a 75% palladium-25% silver alloy of 1 mil thickness and had a surface area of about 5 sq. in. each. Commercial hydrogen was used as the crude gas and nitrogen as the stripper gas. The crude gas was fed to chambers $a$, $c$ and $e$ in parallel. (See FIGURE 2.) The stripper gas was fed to chambers $b$, $d$ and $f$ in parallel. The pressure at which the crude gas was fed upstream was varied ranging to about 65 p.s.i.a. The downstream pressure (the pressure at which the stripper gas was supplied) was controlled so that there was substantially no pressure difference across the unsupported diffusion foils.

Before and after each run the apparatus was tested for leaks. The apparatus was leak checked by evacuating both the upstream and downstream chambers and then allowing a non-diffusible gas, in this case nitrogen, to bleed into the upstream side. The downstream vacuum was read with an ionization gauge. An increase in downstream pressure would have shown a leak.

Results of two typical successive runs are given in Table I. In Run No. 1, the stripper gas was fed cocurrent to the upstream flow. After Run No. 1, the unit was evacuated, returned to room temperature and tested for leaks. In Run No. 2, the stripper gas was fed countercurrent to the upstream flow. Each run took about eight hours to complete.

*Table I*

RATE OF DIFFUSION OF $H_2$ THROUGH Pd-25-Ag-VARIATION WITH PRESSURE AND FLOW

[Temperature in the diffusion unit=450° C. 25 sq. in. of unsupported 1 mil thickness foil]

| Run | $H_2$ input flow (s.c.f.h.) | $N_2$ input flow (s.c.f.h.) | Balanced pressure (p.s.i.a.) | Rate of diffusion of $H_2$ (s.c.f.h.) |
|---|---|---|---|---|
| No. 1 (cocurrent) | 8.1 | 1.0 | 25 | 3.1 |
| | 9.1 | 3.2 | 25 | 4.1 |
| | 9.8 | 4.9 | 25 | 4.8 |
| | 8.8 | 1.5 | 35 | 3.6 |
| | 9.7 | 4.0 | 35 | 4.7 |
| | 10.6 | 6.4 | 35 | 5.5 |
| | 9.2 | 1.9 | 45 | 4.2 |
| | 10.5 | 4.7 | 45 | 5.3 |
| | 11.6 | 7.5 | 45 | 6.5 |
| | 10.2 | 2.4 | 55 | 5.0 |
| | 11.8 | 5.7 | 55 | 5.7 |
| | 13.3 | 8.5 | 55 | 6.4 |
| | 10.6 | 2.7 | 65 | 5.6 |
| | 12.1 | 6.3 | 65 | 7.0 |
| | 13.9 | ~9.2 | 65 | 9.0 |
| No. 2 (countercurrent) | 8.3 | 1.0 | 25 | 3.2 |
| | 9.5 | 3.2 | 25 | 4.4 |
| | 10.2 | 4.9 | 25 | 5.2 |
| | 8.7 | 1.5 | 35 | 3.6 |
| | 10.1 | 4.0 | 35 | 5.0 |
| | 10.8 | 6.4 | 35 | 5.8 |
| | 9.4 | 1.9 | 45 | 4.4 |
| | 10.9 | 4.7 | 45 | 5.9 |
| | 12.2 | 7.5 | 45 | 7.2 |
| | 10.2 | 2.4 | 55 | 5.0 |
| | 12.0 | 5.7 | 55 | 5.8 |
| | 13.5 | 8.5 | 55 | 6.6 |
| | 10.5 | 2.7 | 65 | 5.6 |
| | 12.5 | 6.3 | 65 | 7.5 |
| | 14.3 | ~9.2 | 65 | 9.4 |

From the data in Table I it can be seen that as the total pressure is increased, the rate of diffusion of hydrogen is increased. (It should be noted that the upper limit at which the pressure was supplied was limited by the test equipment, and not by the foil.) It can also be seen that with balanced pressures according to this invention on the upstream and downstream side, the diffusion units can be shut off, evacuated and returned to room temperature without perforating the membranes. The system can either be co-current or counter-current.

EXAMPLE II

Using apparatus of the type described in Example I, which contained a diffusion unit of 5 foils (6 chambers), each foil being a 75% Pd-25% Ag alloy of 1 mil thickness and having a surface area of about 5 sq. in., the system was evacuated on the upstream and downstream side of the diffusion foils. A vacuum of about 25 microns was obtained. Nitrogen was then fed to the upstream chambers of the diffusion unit. At about 5 lbs. pressure differential, a rupture of one of the foils occurred.

This performance of the foils illustrates the relatively small pressure differentials to which diffusion foils can be subjected.

EXAMPLE III

The purpose of this example is to show that even thinner foils than 1 mil can be used.

Using the apparatus described in FIGURE 1 (but using manual pressure controls), containing a diffusion unit which contained a single diffusion diaphragm comprising a 75%-25% silver alloy of 0.8 mil thickness and having a surface area of 4.92 sq. in., the same gases were used as in Example I. Successive runs were made using a countercurrent system at various pressures. The crude hydrogen was fed in each case at a constant rate of flow. The results of tests at 20 p.s.i.a. and 45 p.s.i.a. are given in Table II.

*Table II*

[Temperature in the diffusion unit=450° C. Foil—unsupported—0.8 mil thick]

| $H_2$ input flow (s.c.f.h.) | $N_2$ input flow (s.c.f.h.) | Balanced pressure (p.s.i.a.) | Rate of diffusion of $H_2$ (s.c.f.h.) |
|---|---|---|---|
| 7.8 | 3.5 | 45 | 1.8 |
| 7.8 | 2.25 | 45 | 1.6 |
| 7.8 | 0.8 | 45 | 1.3 |
| 7.8 | 2.25 | 45 | 1.8 |
| 7.8 | 4.7 | 45 | 2.1 |
| 7.8 | 7.05 | 45 | 2.5 |
| 4.0 | 2.15 | 20 | 0.9 |
| 4.0 | 1.4 | 20 | 0.9 |
| 4.0 | 0.56 | 20 | 0.7 |
| 4.0 | 1.4 | 20 | 0.7 |
| 4.0 | 3.0 | 20 | 1.1 |
| 4.0 | 4.5 | 20 | 1.2 |

It can also be seen from Table I and Table II that the rate of hydrogen diffusion is dependent on the rate of flow of the stripper gas (the low partial pressure on the downstream side is controlled by the stripper gas). Where the impurities in the input gas might be concentrated to a point which substantially lowers the $H_2$ upstream partial pressure, such upstream partial pressure can be controlled by regulating the upstream input flow. These are factors which can be controlled by known methods.

It is to be understood that the foregoing description and examples are illustrative of the application of the principles of the invention, and that suitable variations and modifications thereof may be made. By way of illustration, in order to get diffusion through the "palladium" membrane, the partial pressure of hydrogen in the gas on the two sides of the membrane must be significantly different, although it is clear that the "total" pressure on each side of the membrane must be substantially the same. While nitrogen has been shown as an exemplary sweep gas, it is clear that other gases, even gases containing hydrogen as a constituent, may be employed for this purpose. Other sweep gases such as steam, may suitably be employed, and such sweep gases as are readily separable from hydrogen, e.g. steam, can be used to provide hydrogen from the diffuser at a purity of 99.99+%. While the invention is of particular advantage in apparatus employing thin foils as diffusion membranes, the diffusion membrane may have tubular or other geometrical configuration. Numerous other arrangements may be devised by those skilled in the art without departing from the spirit and scope of the invention.

What is claimed is:

1. A process for separating hydrogen from a mixture of gases containing hydrogen which comprises passing said mixture at an elevated pressure of from about 2 to about 100 atmospheres into the input chamber of a diffusion unit having an input chamber and a recovery chamber separated by a thin non-porous diffusion foil unsupported except at the periphery thereof and selectively permeable to hydrogen, said foil being between 0.1 and 1 mil in thickness, and having a surface area of at least about 5 square inches, passing a sweep gas through said recovery chamber, maintaining the pressure in said recovery chamber substantially equal to the pressure in said input chamber to provide a pressure differential across said foil below 10 p.s.i. and less than the rupture pressure of said foil, maintaining the partial pressure of hydrogen in said recovery chamber below the partial pressure of hydrogen in said input chamber, withdrawing diffused hydrogen in admixture with said sweep gas from the recovery chamber, and withdrawing non-diffused component of said mixture from the input chamber.

2. The process of claim 1 characterized in that said diffusion unit is maintained at a temperature from about 200° C. to about 800° C.

3. The process of claim 1 wherein said foil comprises a material selected from the group consisting of palladium and palladium alloys.

4. The process of claim 1 wherein said foil comprises metallic palladium.

5. The process of claim 1 wherein said foil comprises palladium-silver alloy.

6. The process of claim 1 wherein nitrogen is used as the sweep gas.

7. The process of claim 1 wherein steam is used as the sweep gas.

References Cited by the Examiner

UNITED STATES PATENTS

| 1,619,948 | 3/1927 | Mangiameli | 137—98 X |
| 2,255,069 | 9/1941 | Maier | 55—16 |
| 2,773,561 | 12/1956 | Hunter | 55—16 |
| 2,958,391 | 11/1960 | De Rosset | 55—158 X |
| 3,155,467 | 11/1964 | Yamamoto et al. | 55—16 |

REUBEN FRIEDMAN, *Primary Examiner.*

C. N. HART, *Assistant Examiner.*